Figure 1:
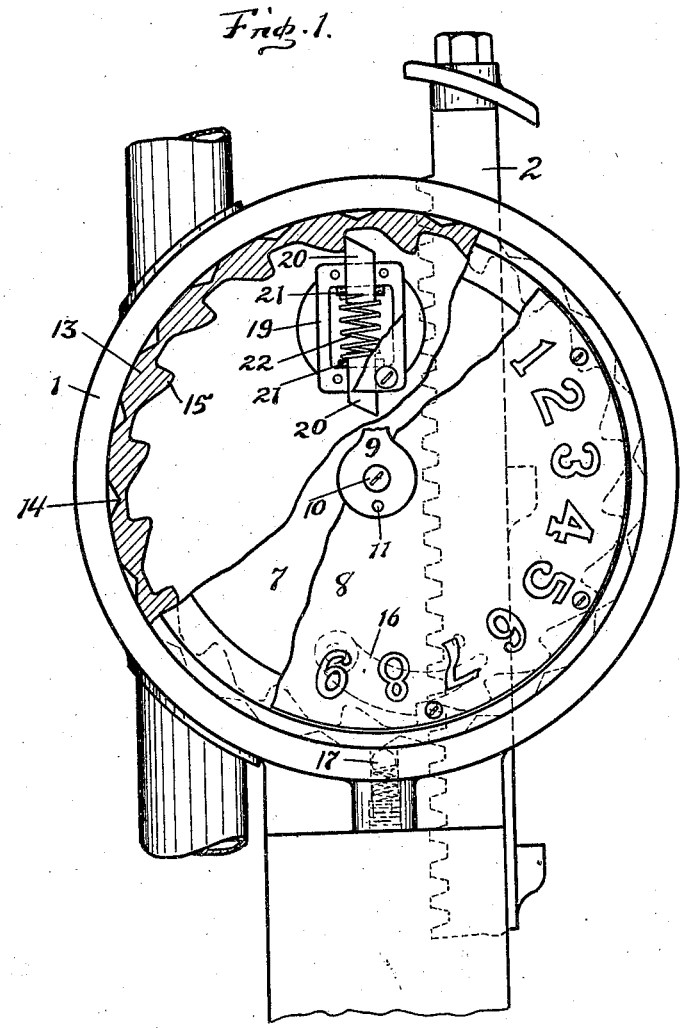

Jan. 22, 1924.

G. U. BRAKE 1,481,773

COUNTER FOR DISPENSING PUMPS

Filed May 14, 1921

2 Sheets-Sheet 1

George U. Brake, Inventor

By Walter G. Burns
Attorney

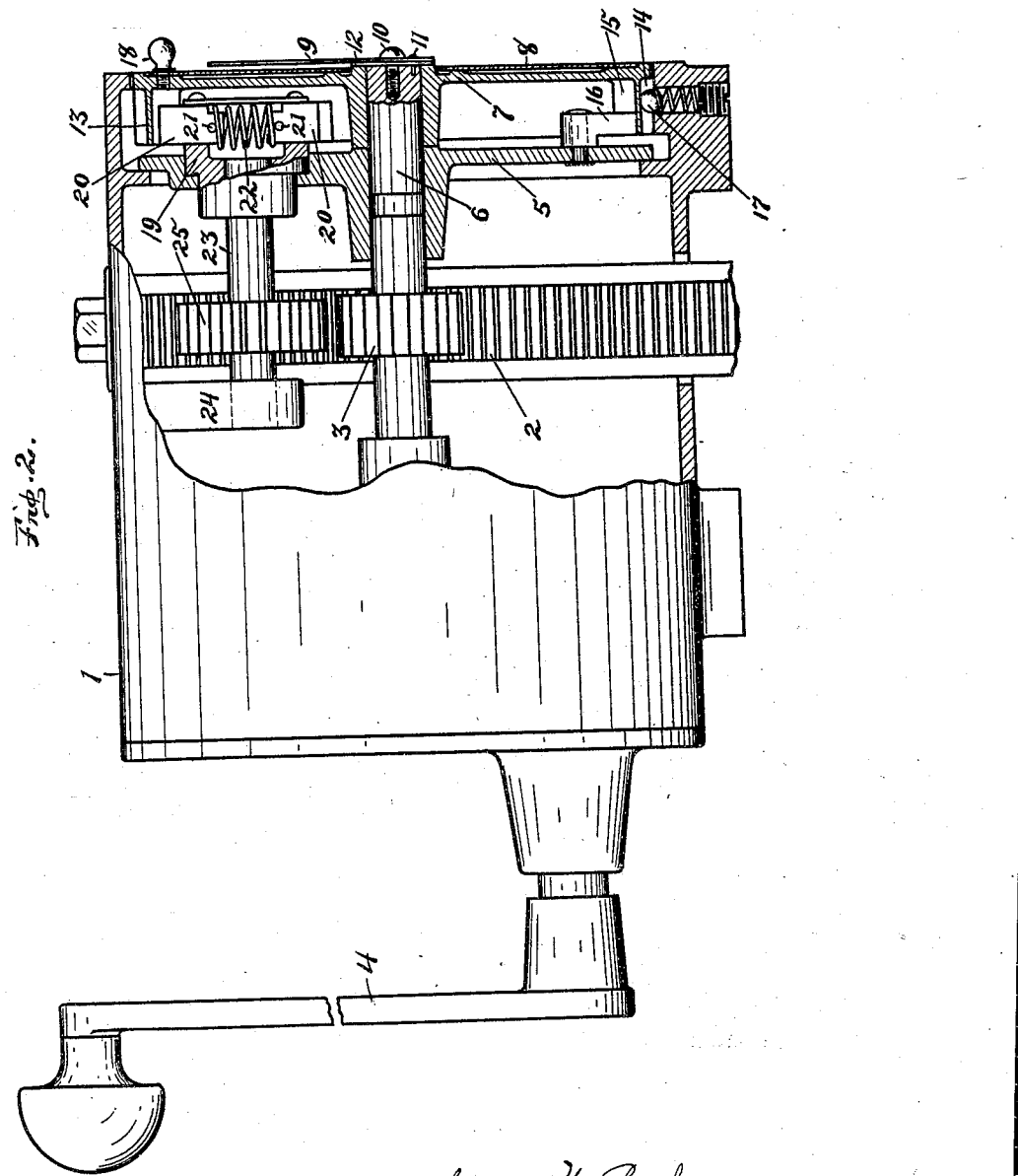

Patented Jan. 22, 1924.

1,481,773

UNITED STATES PATENT OFFICE.

GEORGE U. BRAKE, OF FORT WAYNE, INDIANA, ASSIGNOR TO TOKHEIM OIL TANK AND PUMP COMPANY, A CORPORATION OF INDIANA.

COUNTER FOR DISPENSING PUMPS.

Application filed May 14, 1921. Serial No. 469,749.

*To all whom it may concern:*

Be it known that I, GEORGE U. BRAKE, a citizen of the United States of America, and resident of Fort Wayne, in the county of Allen and State of Indiana, have invented certain new and useful Improvements in Counters for Dispensing Pumps, of which the following is a specification.

This invention relates to improvements in counters for pumps of that type used for dispensing liquid in definite units of measurement, and the object thereof is to provide a construction in connection with the gear mechanism and housing of a dispensing pump by means of which the quantity of liquid discharged from the pump will be plainly indicated as the pump is operated, and which is so arranged as to be free from being obstructed. Another object is to construct the device so that its various parts may be easily assembled.

These objects are accomplished by the construction illustrated in the accompanying drawings in which:—

Fig. 1 is a front elevation of the gear housing of a pump in which the invention is included, parts thereof being shown broken away; and Fig. 2 is a side elevation of the same, parts thereof being shown broken away and in central section.

Similar characters of reference indicate corresponding parts in both views and having reference now to the same:

1 is a cylindrical gear housing and 2 is a pump rack extending through the housing and 3 is a driving gear for actuating the rack when the crank 4 is operated, the pump rack and the gearing for reciprocating the same, being of known construction and operation. The housing 1 is of cylindrical form arranged with its axis in horizontal position and has an internal head 5 fixed in one end, in the center of which is rigidly mounted an outwardly protruding stud 6. Upon the stud 6 is loosely mounted a flanged wheel 7 having upon its outer face a fixed dial 8, and upon the outer end of the stud is fixed an index 9 by means of a screw 10 and pin 11, there being a washer 12 between the index and stud that bears against the outer end of the hub of the wheel so as to retain the wheel in place. The flange 13 of the wheel 7 extends inwardly and has an annular series of external notches 14 and also an internal annular series of teeth 15, the said notches and teeth being equally numerous and spaced apart. A detent pawl 16 pivotally supported by the head 5 is adapted to engage the internal teeth 15 so that the wheel may be progressed only in one direction. Also, a spring pressed ball 17 is arranged in the housing so as to bear against the external face of the flange and enter the notches 14 successively as the wheel is progressed, the function of the ball being to centre the wheel definitely at each of its successive stages of progression. The wheel has also a knob 18 by which it is adapted to be manipulated.

In the head 5 is rotatably mounted a box 19 having oppositely protruding ratchets 20. Near the inner end of each ratchet is a pin 21 engaged by a spring 22 which is positioned between the two ratchets and acts to hold them respectively in their outermost positions. The pins also serve to limit the extent of the outward movements of the ratchets by coming into contact with the inner wall of the box.

A shaft 23 is mounted in a bearing 24 in the housing and extends centrally into the box 19 with which it is rigidly fixed, and upon the shaft 23 is rigidly mounted a pinion 25 which is engaged by the rack 2 so as to be actuated thereby. As the pinion 25 is rotated by the rack, the box 19 becomes likewise rotated through the medium of the shaft 23. The ratchets 20 and the teeth 15 are so shaped that when the box is rotated during the upward movement of the rack the wheel 7 will be progressed by the action of the ratchets against the teeth, and permit the wheel to idle when the box is rotated in the opposite direction during the downward stroke of the rack.

A feature of the invention is the arrangement of the wheel in relation with the shell of the housing so as to form the closure for the corresponding end thereof as well as to form the rotating member of the counter.

In the operation of the invention the pump rack is reciprocated by manipulating the crank, and as in the ordinary practice, liquid is discharged from the pump during the upward stroke of the rack in quantity proportionate with the extent of the upward movement of the rack. As the rack is moved upwardly the box having the ratchets is revolved through the medium of the pinion 25 and shaft 23 and the ratchets alternately engage the teeth of the rotating member 13 and progress the member from one stage to another, the spring pressed ball entering the notches at the successive stages, tends to hold the member accurately positioned at its various stages. When the rack is moved downwardly the box is rotated in the opposite direction and the member being held by the pawl from retracting remains stationary while the ratchets idly pass the adjacent tooth of the member.

The index 9 being fixedly positioned, and the dial fixed on the rotating member being movable therewith, the annular series of characters of the dial become progressed in successive order in line with the index as the rotating member is actuated by the ratchets. The dial characters being significant of the quantity units of liquid discharged by the pump at the corresponding stages of its operation indicate the amount of liquid dispensed. The rotating member may be moved by turning the knob 18 independent of the operation of the pump so that the dial characters will be positioned relative to the index suitably for the commencement of the operation of the pump.

What I claim is:—

1. In a mechanism for a counter, a shell having a fixed head at one end, a toothed rotor in the other end of the shell and forming a closure therefor, said rotor being revoluble in one direction only; a second rotor revoluble in both directions and supported in the shell; a pair of radially disposed ratchets positioned in said second rotor posed each other; each having diametrically opposite each other; each having means to limit its outward movement; a spring supported by and pressing both of said ratchets outwardly, said second rotor being located so that said ratchets alternately engage and actuate said toothed rotor when operated in one direction; and means for actuating said second rotor alternately in opposite directions.

2. In a mechanism for a counter and the like, a toothed rotor revoluble in one direction only; a second rotor revoluble in both directions; a pair of radially disposed ratchets positioned in said second rotor diametrically opposite each other, each having means to limit its outward movement; a coil spring positioned between said ratchets, in axial alinement therewith, and pressing said ratchets lengthwise in opposite directions, said second rotor being located so that said ratchets alternately engage and actuate said toothed rotor when operated in one direction; and means for actuating said second rotor alternately in opposite directions.

In testimony whereof I affix my signature, in presence of two witnesses.

GEORGE U. BRAKE.

Witnesses:
MATILDA METTLER,
WALTER G. BURNS.